(12) United States Patent
Bosnar

(10) Patent No.: US 6,501,276 B1
(45) Date of Patent: Dec. 31, 2002

(54) FREQUENCY DOMAIN ELECTROMAGNETIC GEOPHYSICAL MAPPING INSTRUMENTS

(76) Inventor: Miro Bosnar, 242 Burbank Drive, North York, Ontario (CA), M2K 1P8

( * ) Notice: Subject to any disclaimer, the term of this patent is extended or adjusted under 35 U.S.C. 154(b) by 0 days.

(21) Appl. No.: 09/136,319

(22) Filed: Aug. 18, 1998

(51) Int. Cl.$^7$ ............... G01V 3/10; G01V 3/165; G01V 3/16

(52) U.S. Cl. ............... 324/334; 324/330; 324/335

(58) Field of Search ............... 324/326, 330, 324/334, 335, 336, 357, 360, 362–364

(56) References Cited

U.S. PATENT DOCUMENTS

| | | | | |
|---|---|---|---|---|
| 3,950,695 A | * | 4/1976 | Barringer | 324/334 |
| 3,967,190 A | * | 6/1976 | Zonge | 324/362 |
| 4,629,990 A | * | 12/1986 | Zandee | 324/335 X |
| 4,996,484 A | * | 2/1991 | Spies | 324/334 |
| 5,796,253 A | * | 8/1998 | Bosnar et al. | 324/336 |

* cited by examiner

Primary Examiner—Gerard Strecker

(57) ABSTRACT

A frequency domain electromagnetic geophysical mapping instrument has a transmitter, a transmitter coil connected to the transmitter, the transmitter generating current pulse waveforms formed by half-sinusoidal output waveform segments of a waveform having a frequency equal to a resonant frequency of the transmitter coil, and a receiver, in which the transmitter generates current pulses including pulses comprising a plurality of immediately successive half-sinusoidal waveform segments of common polarity. The pulses immediately succeed each other and are of alternating polarity. The pulse lengths may in this case be equal, or vary in a manner providing a desired output spectrum, for example according to a pseudo-random sequence.

5 Claims, 6 Drawing Sheets

D1,2

D7,8

D5,6

D3,4

FREQUENCY DOMAIN ELECTROMAGNETIC GEOPHYSICAL MAPPING INSTRUMENTS

BACKGROUND OF THE INVENTION

1. Field of the Invention

This invention relates to electromagnetic geophysical mapping instruments.

2. Review of the Art

In my co-pending patent application Ser. No. 08/657,454 now U.S. Pat. No. 5,796,253 the disclosure and drawings of which are incorporated herewith by reference, there is disclosed a time domain electromagnetic geophysical mapping instrument having a transmitter, the transmitter having a transmitter including a transmitter coil, the transmitter generating intermittent current pulse waveforms, formed by half-sinusoidal output wave form segments of a waveform having a frequency equal to a resonant frequency of the transmitter coil, and a receiver including a receiver coil, in which the transmitter generates current pulses which typically comprise a plurality of immediately successive half-sinusoidal waveforms of common polarity.

Techniques for the application of frequency-domain electromagnetic (FDEM) instruments for general geological mapping and the direct detection of sub-surface metallic mineral deposits have been well documented over the years. FIGS. 1A and 1B depict typical FDEM system configuration for airborne and ground based systems respectively.

The technique is based on the measurement of the secondary magnetic field from subsurface targets, as a result of the primary alternating magnetic field established by the system transmitter.

In its simplest form, the typical system will operate at a single frequency with a single receiver transmitter coil pair. To obtain as much information as possible about the sub-surface target a range of single frequencies is transmitted and the responses measured one at a time in sequence. To cover the necessary range of frequencies, a long measuring time is required. This makes system operation inefficient and time consuming.

Sometimes, especially in airborne systems, multiple transmitter and receiver sets are employed, operating at different frequencies, so that information at multiple frequencies is obtained simultaneously. The multi-coil system is very often complex, heavy and expensive to build and maintain.

A wideband current waveform can be generated to allow fast multi-frequency electromagnetic field measurement by employing pulse modulation techniques. The conventional pulse modulation technique utilizes a pseudo-random binary sequence, where the multi-frequency signal is generated in a simple, straight forward and controlled manner. The pseudo-random binary signal has well defined frequency spectrum and it is simple to build and implement.

FIG. 2A shows an example of a pseudo-random signal waveform a and FIG. 2B shows its power spectrum.

Other waveforms, for example a square waveform, can also be used to generate a spectrum of frequencies.

In order to achieve the maximum depth of exploration, having regard to external and internal system noise, it is necessary to maximize the transmitter dipole moment (product of transmitter coil area, number of turns and output current).

There is always constraint on transmitter coil area (size) and available power, so that a practical way to increase dipole moment is to increase the number of turns of the transmitter loop.

Since the inductance of a multi-turn loop is proportional to square of the number of turns according to the relationship $L=KN^2(a+b)$ where: L is inductance of the loop, N is number of turns, a and b are loop dimensions and K is a constant, multi-turns loop in general have large inductance and therefore high impedance that prevents the use of large currents. In order to overcome the high impedance of the transmitter loop, the output coil is often resonated with a capacitor to a particular frequency, a technique well known to the radio-engineering community.

If at a particular frequency, a capacitor in series with transmitter loop is selected so to have the same absolute impedance as the coil inductance, the maximum current will be supplied to the output coil. This is illustrated by FIG. 3, in which the circuit values shown are related as follows;

$$i(t) = \frac{e(t)}{r + \left(\varpi L - j\frac{1}{\varpi C}\right)}$$

$$\text{if } |\varpi L| = \left|\frac{1}{\varpi C}\right|$$

$$\text{Then } i(t) = \frac{e(t)}{R}$$

It is an object of the present invention to combine the efficiency of a tuned transmitter coil with a wide band output, using a transmitter arrangement of the kind described in the parent application; the invention employs such a transmitter in a frequency domain electromagnetic mapping instrument, utilizing for example a pseudo-random input signal waveform to the transmitter.

The invention thus provides a frequency domain electromagnetic geophysical mapping instrument comprising a transmitter and a transmitter coil connected to the transmitter, the transmitter generating current pulse waveforms, formed by half-sinusoidal output waveform segments of a waveform having a frequency equal to a resonant frequency of the transmitter coil, and a receiver, in which the transmitter generates current pulses comprising a plurality of immediately successive half-sinusoidal waveforms of common polarity, the pulses immediately succeeding each other being of alternating polarity. The pulse lengths may be equal, or vary in a manner providing a desired output spectrum, for example according to a pseudo-random sequence.

SHORT DESCRIPTION OF THE DRAWINGS

FIG. 2A shows a typical pseudo-random signal waveform utilized to generate a broad band signal by a pulse modulation technique, while

Figure 1A:
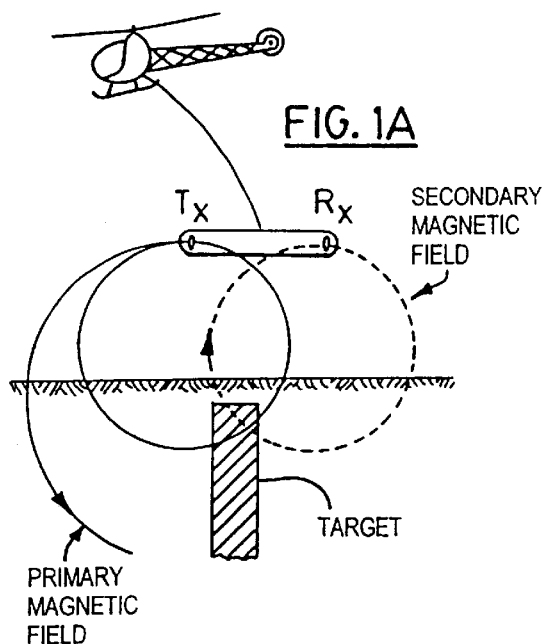
FIGS. 1A and 1B show respectively the basic principles of prior art airborne and ground-based frequency domain electromagnetic geophysical mapping instruments.
Figure 1B:
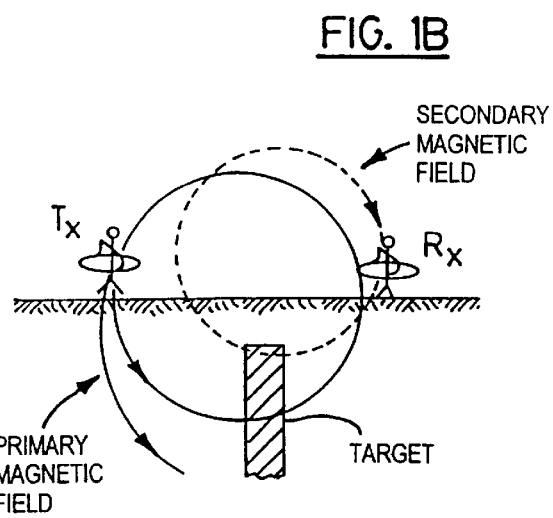
Figure 2A:
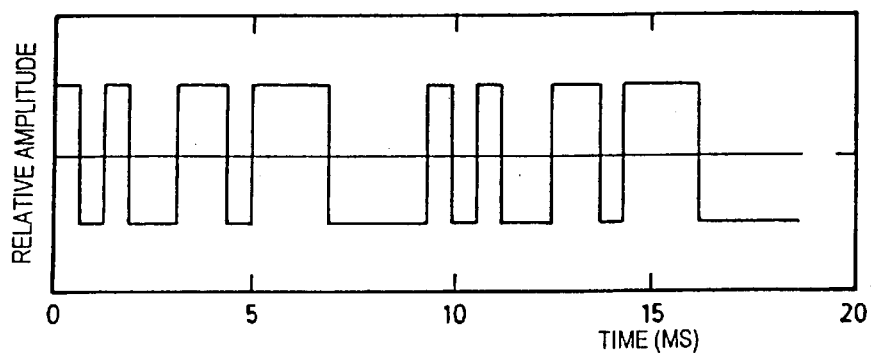
Figure 2B:
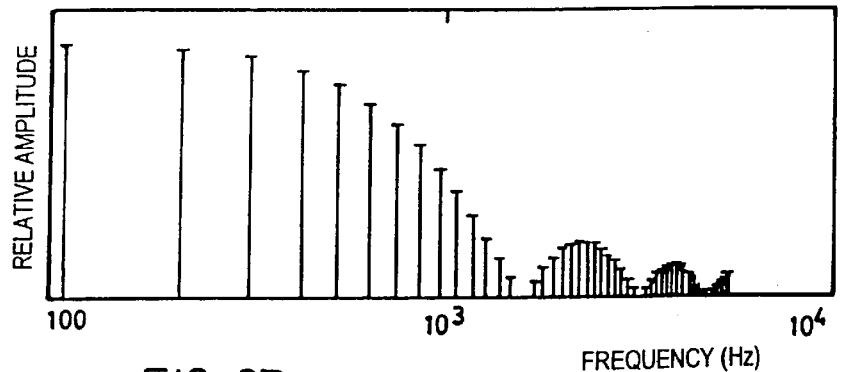
FIG. 2B shows the power spectrum of such a signal, both figures representing prior art.
Figure 3:
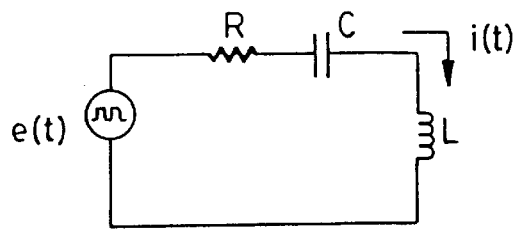
FIG. 3 illustrates the known relationships existing in a tuned circuit.
Figure 4A:
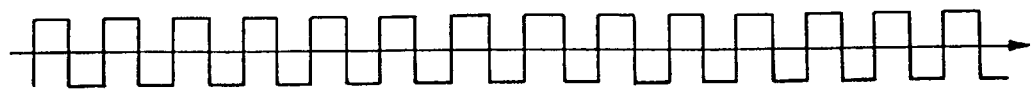
Figure 4B:
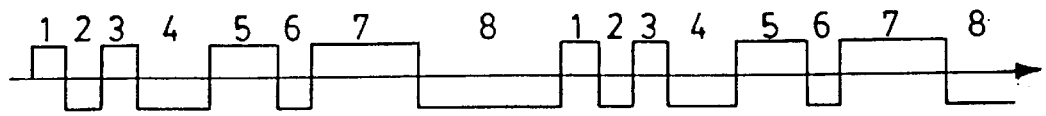
Figure 4C:
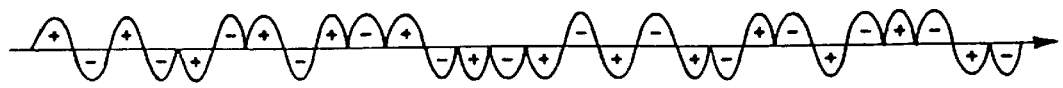
Figure 4D:
Figure 4E:
Figure 4F:
Figure 4G:
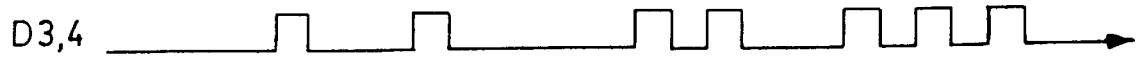
Figure 5A:
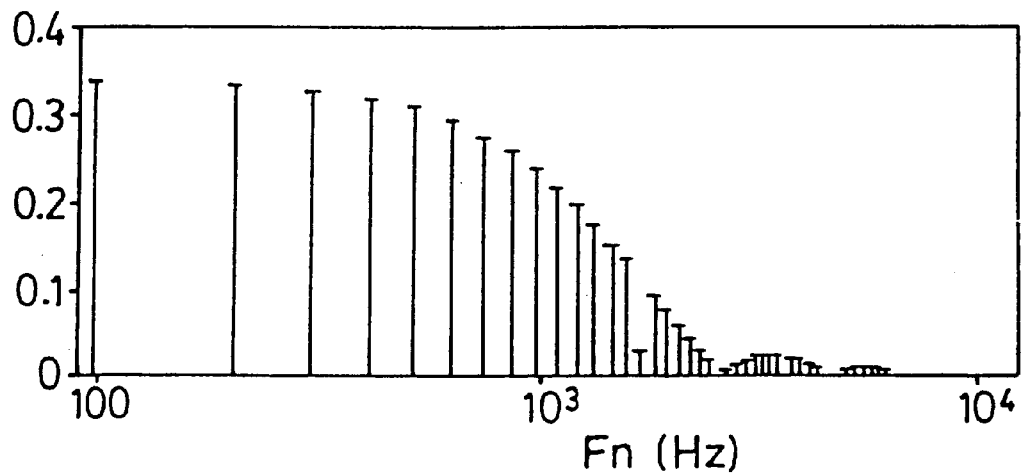
Figure 5B:
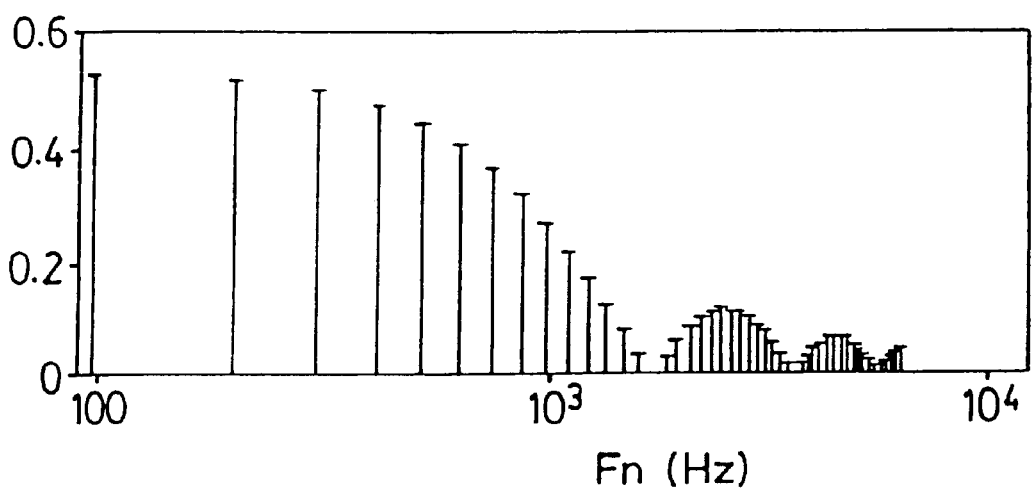
Figure 6:
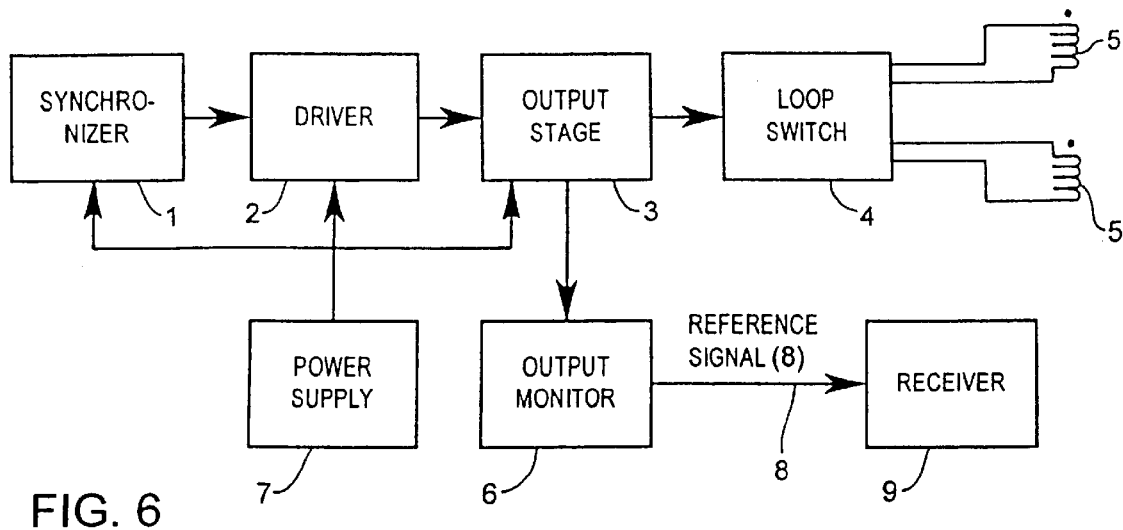
Figure 7:
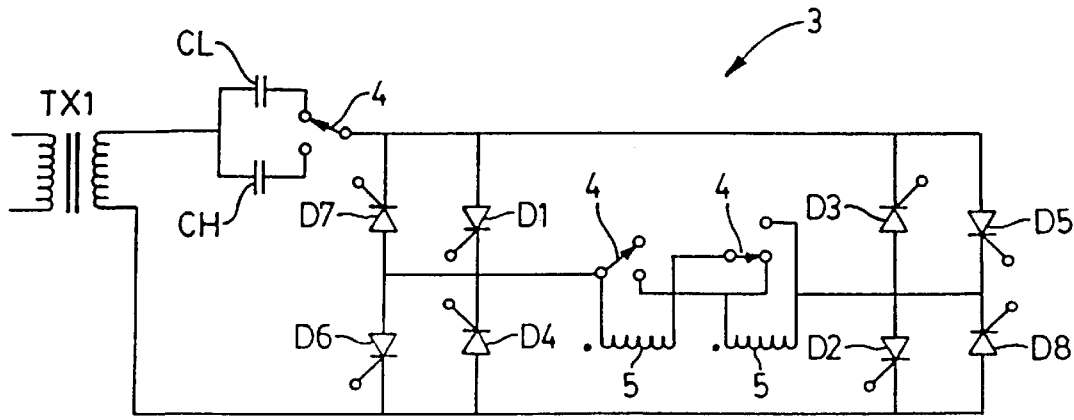
Figure 8:
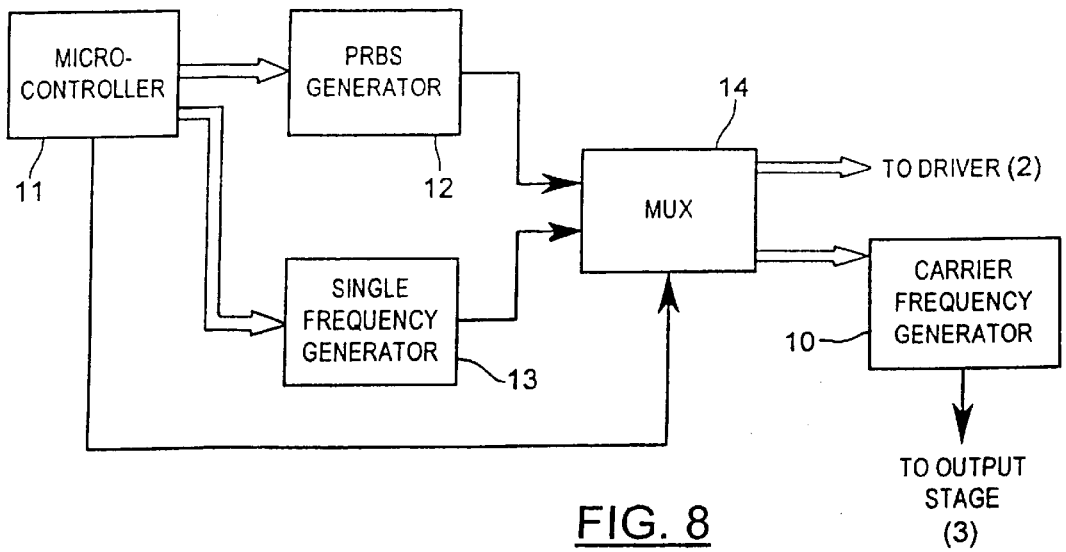
Figure 9A:
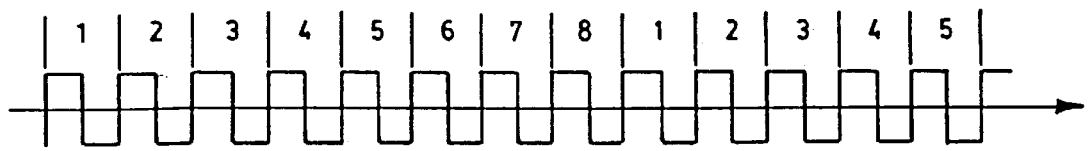
Figure 9B:
Figure 9C:
Figure 9D:
Figure 9E:
Figure 9F:
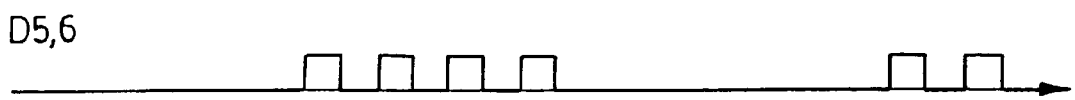
Figure 9G:
Figure 10A:
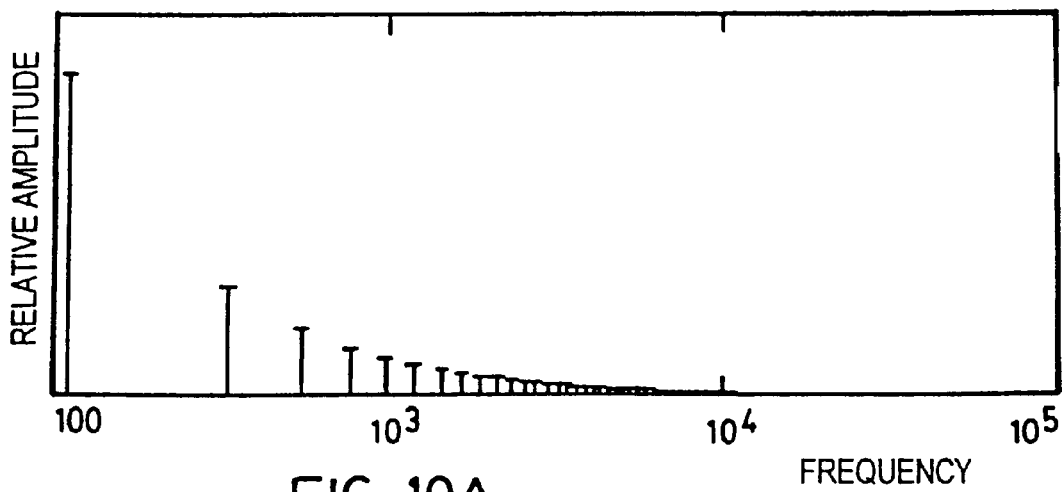
Figure 10B:
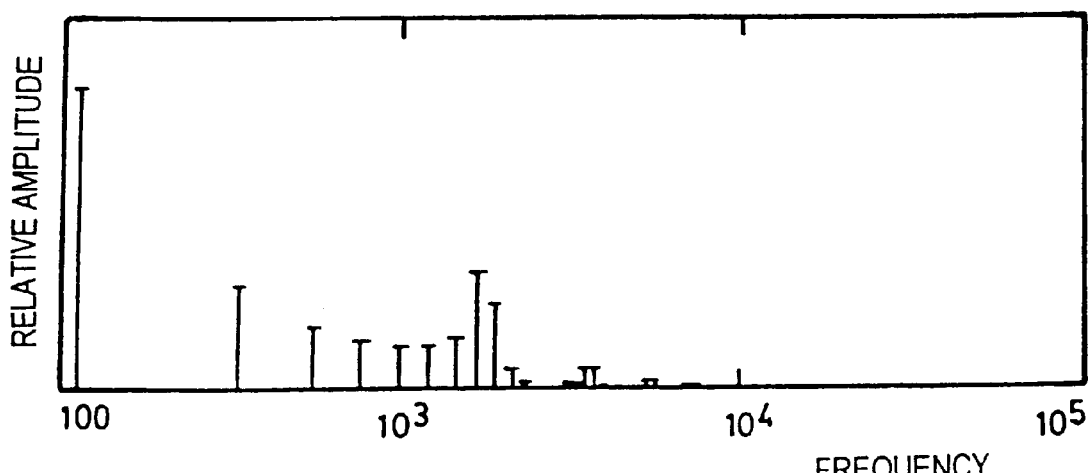

FIGS. 4A and 4B illustrate respectively a fundamental clock signal and a pseudo-random pulse sequence of known type as used to energize a pulse modulation transmitter, while FIG. 4C illustrates an exemplary transmitter output waveform produced by a transmitter in accordance with the invention, and FIGS. 4D, 4E, 4F and 4G illustrate waveforms derived from waveforms 4A and 4B and used to generate waveform 4C;

FIGS. 5A and 5B compare the power spectrums generated by waveforms as shown in FIGS. 4B and 4C;

FIG. 6 is a block diagram of a transmitter for geophysical electromagnetic mapping in accordance with the invention;

FIG. 7 is a more detailed schematic diagram of certain stages of the transmitter of FIG. 6;

FIG. 8 is a block diagram of one embodiment of synchronizer for use in the transmitter of FIG. 6;

FIGS. 9A through 9G are waveforms occurring in a transmitter according to the invention when operated in square wave mode; and FIGS. 10A and 10B illustrate the power spectrum generated respectively by the waveforms of FIGS. 9B and 9C respectively.

Operation of the transmitter described with reference to FIGS. 4–10 is very similar in many respects to that of the transmitter described in application Ser. No. 08/657,454 save that the waveform produced in a time domain electromagnetic geophysical mapping instrument will normally be discontinuous so as to provide intervals in which signals may be received in the absence of transmitted signals, whereas in a frequency domain system, the transmitter signal will normally be continuous, since the receiver operates at the same time as the transmitter.

Referring to FIG. 6, a synchronizer 1 provides the basic time base and control signals for the-remaining stages. A driver section 2 includes a carrier generator which generates a driver signal at a fundamental carrier frequency, and a number of control signals as described further below which when applied to an output stage 3 together with the carrier switch the latter in a manner described further below to produce an output signal of a desired configuration which is fed to a transmitter loop or coil. In fact there are two transmitter coils 5, which may be switched in either series or parallel by a loop switch 4 as described further below. An output is also taken from the output stage to an output monitor 6, which provides a reference signal 8 to a receiver 9. The transmitter is powered by a power supply 7.

The output stage 3 is shown in more detail in FIG. 7. The carrier signal from the synchronizer is applied through a transformer TX1 to a tuned circuit comprising one of two capacitors CH and CL according to the position of a set of contacts of the loop switch 4, and the coils 5, connected either in series or parallel according to the position of further contacts of the loop switch 4. A series of thyristors arranged in pairs D1 D2; D3, D4; D5, D6; and D7, D8 bridge the coils 5 into the tuned circuit in different orientations according to which pair of thyristors is switched on by control signals received from the synchronizer 1. Thus when thyristors D1 and D2 are turned on, current may pass forwardly from the selected capacitor through the coils from left to right (as shown in the figure), whereas when thyristors D7 and D8 are selected, current may follow the same path in the opposite direction. When thyristors D5 and D6 are selected, current may flow forwardly from the capacitor through the coils from right to left, and when thyristors D3 and D4 are selected, it may flow to the capacitor in the opposite direction.

FIGS. 9A to 9G show waveforms at different points in the circuit. FIG. 9B is a binary pseudo-random pulse modulation waveform, to which FIG. 9C, showing the current flowing through the coils 5, represents an approximation. The waveform 9B is utilized in the synchronizer in conjunction with the basic clock signal 9A driving a carrier frequency generator 10 to generate control signals shown in FIGS. 9D, 9E, 9F and 9G which drive the pairs of thyristors D1, D2; D7, D8; D5, D6; and D3, D4. The result is that the tuned circuit formed by the coils 5 and the selected capacitor resonates at a defined frequency equal to the carrier frequency, and successive half cycles of the sinusoidal waveform pass in the coils so as to generate the transmitted signal shown in FIG. 9C.

The output stage shown is capable of operating at two resonant frequencies by operating the loop switch 4. In a high frequency range, the coils 5 are switched in parallel, and tuned by the capacitor CH, while in a low frequency range, the coils are connected in series and tuned by a capacitor CL. This selection allows measurements to be made across a greater range of frequencies.

Although the embodiment described so far utilizes a pulse modulator driven by a pseudo-random binary sequence generator 12, which forms part of the synchronizer 1 (see FIG. 8), modulation may also be achieved using other forms of pulse train, for example a square wave, to provide an approximation to a square wave produced by a series of successive half cycles of a sinusoidal waveform of the same polarity, followed by a similar series of the opposite polarity, as shown in FIG. 9C. The waveform 9C may be generated in a similar manner to that already described, with the control waveforms of FIGS. 9D, 9E, 9F and 9G being generated from the basic clock signal 9A, which is the same as that of FIG. 9A, and a square wave signal 9B. The power spectrum of the signals generated using the waveform of FIG. 9B and the waveform of FIG. 9C are compared in FIGS. 10A and 10B.

Referring back to FIG. 8, which shows an exemplary embodiment of the synchronizer, this comprises a microcontroller 11 controlling a pseudo-random binary sequence generator 12 generating the waveform 9B, and a frequency generator 13, generating the waveform 9B. The outputs of these generators are applied to a multiplexer 14 controlled by the microcontroller, which in turn provide outputs controlling the carrier frequency generator and the thyristors in the output stage.

The signals received by the receiver 9 are compared with the reference signal 8 in order to assess the effect of the terrain on signal components at different frequencies, in accordance with known frequency domain magnetic geophysical mapping techniques.

I claim:

1. A frequency domain electromagnetic geophysical mapping instrument comprising a transmitter and a transmitter coil connected to the transmitter, the transmitter generating current pulse wave forms formed by half-sinusoidal output waveform segments of a waveform having a frequency equal to a resonant frequency of the transmitter coil, and a receiver, wherein the transmitter generates current pulses, including pulses comprising a plurality of immediately successive half-sinusoidal waveform segments of common polarity, wherein the transmitter generates pulses immediately succeeding each other and of alternating polarity.

2. An instrument according to claim 1, wherein the transmitter generates pulses whose width varies according to pseudo-random sequences.

3. An instrument according to claim 1, wherein the transmitter generates successive pulses of equal width.

4. An instrument according to claim 1, wherein the transmitter is switchable to generate successive pulses of width varying according to a pseudo-random sequence or to generate successive pulses of equal width.

5. An instrument according to claim 1, wherein the transmitter coil comprises two coils switchable in series or parallel, and is resonated at one of two fundamental frequencies by one of two capacitors selected according to whether the coils are switched in series or parallel.

* * * * *